United States Patent
Betke et al.

(10) Patent No.: US 8,641,316 B2
(45) Date of Patent: Feb. 4, 2014

(54) PRESS-FIT CONNECTION FOR A RACK HOUSING

(75) Inventors: Klaus Betke, Hamm (DE); Daniel Büning, Niederkrüchten (DE)

(73) Assignee: Ford Global Technologies, LLC, Dearborn, MI (US)

( * ) Notice: Subject to any disclaimer, the term of this patent is extended or adjusted under 35 U.S.C. 154(b) by 100 days.

(21) Appl. No.: 13/210,814

(22) Filed: Aug. 16, 2011
(Under 37 CFR 1.47)

(65) Prior Publication Data
US 2012/0087715 A1     Apr. 12, 2012

Related U.S. Application Data

(63) Continuation of application No. PCT/EP2009/065239, filed on Nov. 16, 2009.

(30) Foreign Application Priority Data

Feb. 16, 2009   (DE) .......................... 10 2009 000 900

(51) Int. Cl.
*B25G 3/20*    (2006.01)
*F16B 2/00*    (2006.01)
*F16B 7/04*    (2006.01)

(52) U.S. Cl.
USPC ............ 403/368; 403/282; 403/369; 180/428

(58) Field of Classification Search
USPC ........... 403/280, 282, 367–370, 202; 180/428
See application file for complete search history.

(56) References Cited

U.S. PATENT DOCUMENTS 2,699,589 A * 1/1955 Redell ........................ 294/102.1

FOREIGN PATENT DOCUMENTS

| DE | 2133933 A1 | 2/1972 |
| DE | 10033305 A1 | 1/2002 |
| FR | 1346426 A | 12/1963 |
| GB | 1357796 A * | 6/1974 |
| WO | 2010091749 A1 | 8/2010 |

OTHER PUBLICATIONS

International Search Report for PCT/EP2009/065239 issued Jan. 25, 2010; 4 pages.

* cited by examiner

*Primary Examiner* — Gregory Binda
*Assistant Examiner* — Nahid Amiri
(74) *Attorney, Agent, or Firm* — Additon, Higgins, Pendleton & Ashe, P.A.

(57) ABSTRACT

This invention relates to an arrangement comprising a tubular housing, preferably a rack housing (1) that accommodates a rack (10), and at least one retention and/or support ring (2, 2') which is disposed at least in part inside the rack housing (1) and is pressed into the housing (1) such that the retention and/or support ring (2, 2') expands. The arrangement is characterized in that a toothed section (4, 4') is provided on an external circumferential surface of the retention and/or support ring (2, 2') adjoining the housing (1). The invention further relates to an associated method for mounting at least one retention and/or support ring (2, 2') inside a tubular housing (1).

11 Claims, 2 Drawing Sheets

PRESS-FIT CONNECTION FOR A RACK HOUSING

This nonprovisional application is a continuation of International Application No. PCT/EP2009/065239, which was filed on Nov. 16, 2009, and which claims priority to German Patent Application Nos. DE 10 2009 000 900.0, which was filed in Germany on Feb. 16, 2009, respectively, and which are all herein incorporated by reference.

BACKGROUND OF THE INVENTION

The invention relates to an assembly consisting of a tubular housing, which, for example, serves for accommodating a rack, and of at least one retention and/or support ring disposed inside the housing and pressed into the rack housing while the retention and/or support ring expands, and an assembly method therefor. Rack-and-pinion steering mechanisms are used in motor vehicles in order to convert the rotary steering movement applied through the steering wheel into a rectilinear movement for pivoting the vehicle wheels to be steered. In order to assist the steering effort, a servo drive is used which can be disposed at suitable areas within the steering power train.

In the case of the rack-and-pinion steering mechanism, the end of the steering column is connected to a pinion engaging the rack and laterally displacing it when the steering mechanism is rotated. One track rod, respectively, is connected to each of the two ends of the rack via a ball joint. The extremely low wear has provided for widespread use of the rack-and-pinion steering mechanism. Rack-and-pinion steering mechanisms have a good feedback and a very good resilience.

Usually, the rack housing is used for a so-called servo-assisted rack-and-pinion steering mechanism, with the rack housing encompassing the rack in a tubular manner and being divided into a hydraulic area and a mechanical area.

The mechanical area is the area in which the area of the rack moves that is provided with teeth and that is in engagement with a pinion rotating with the steering movement of the steering wheel. The pinion engagement area is thus located within the mechanical area of the rack housing. The hydraulic area is the area into which the rack also extends but in which it normally does not comprise any teeth. Within the hydraulic area the rack is rigidly connected to a slidably mounted piston member, the piston member respectively defining one cylinder chamber in the hydraulic area of the rack housing. When the steering wheel of the vehicle is rotated, a control valve is actuated so that hydraulic oil flows into one of the cylinder chambers, respectively, whereby the piston and thus the rack are displaced in the cylinder. The displacement of the piston caused by the hydraulic oil serves as a force augmentation for the movement of the rack—and thus for the steering movement. To this end, the control valve and the rack housing are interconnected through hydraulic lines, so that, depending on the direction of rotation of the steering wheel, one or the other cylinder chamber is pressurized with oil, or the pressure can be relieved.

A support ring which transmits the hydraulic internal forces into the rack housing and which generally also retains a sealing member, for example an O ring, is usually disposed between the mechanical area and the hydraulic area. At the respective end of the rack housing, a support ring limiting the hydraulic or the mechanical area is furthermore provided, which also serves, for example, as a stop for the longitudinal displacement of the rack due to the ball joint, which is respectively mounted on the end of the rack, striking this support ring.

BRIEF DESCRIPTION OF RELATED ART

Pressing in rack guiding members into both end portions of the rack housing while simultaneously expanding the rack housing is known from DE 100 33 305 C2, with a seat for bellows being created while the rack housing is expanded.

BRIEF SUMMARY OF THE INVENTION

The object of the present invention lies in reducing the production effort and the costs for attaching support and/or retention rings to a housing, in particular a rack housing while nevertheless meeting the high requirements for strength and quality at the same time. Advantageous embodiments are in each case the subject matter of the dependent claims. It must be remarked that the features cited individually in the patent claims can be combined with each other in any technologically feasible manner and present other embodiments of the invention. The description, in particular in conjunction with the figures, additionally characterizes and specifies the invention.

According to the invention, the assembly comprises at least one tubular housing, preferably a rack housing serving for accommodating the rack, and at least one retention and/or support ring which is at least partially disposed inside the rack housing. The retention and/or support ring, which is hereinafter also referred to as a ring, is pressed into the housing while the retention and/or support ring is expanded. The retention and/or support ring is expanded, for example, substantially in its radial direction. The assembly according to the invention is characterized in that a toothed section is provided on the outer circumferential surface of the retention and/or support ring adjacent to the housing. By pressing, the toothed portion of the retention and/or support ring is stamped into the housing, more precisely into its inner wall, and thus provides for a particularly secure connection, the durability of which, in particular in the case of a load in the axial direction of the housing, goes beyond merely pressing plane contact surfaces together, and without the components having to be welded together expensively. Moreover, the problems caused by welding, i.e. that the support and/or retention ring is difficult to access inside the rack housing and the thermal stress occurring in the process has a disadvantageous effect on the stability of the components, are eliminated. Preferably, the retention and/or support ring is disposed in the housing in such a way that their radial and axial directions are parallel to each other.

The term support and/or retention ring within the meaning of the invention is to be interpreted broadly. According to the invention, this can be an annular element with a retention and/or supporting function. It serves, for example, to guide and support the rack in the rack housing. Moreover, it can serve for retaining and/or supporting a sealing member or a separate rack guide member, or for connecting two tubular housing parts if the housing has several parts.

Moreover, the term toothed portion within the meaning of the invention is to be interpreted broadly. According to the invention, the toothed portion is one or more raised portions on the surface adjacent to the housing, in particular the outer circumferential surface, of the retention and/or support ring. For example, it is a singular raised portion in the shape of a tooth on the outer circumferential surface of the retention and/or support ring, or several raised portions distributed over the surface adjacent to the housing. In another embodiment, it is also one or more uniformly spaced, annular raised portions on the outer circumferential surface.

The invention is also not limited with regard to the design of the housing. Preferably, it is a rack housing. Rack housings are, for example, produced from aluminum by die-casting. Machining is required after casting, for example in order to be able to mount the pinion unit on the rack housing; contact surfaces are also milled in for the parts to be mounted. Blind bores and through bores for attachment purposes are also produced. Preferably, the rack housing is manufactured from steel. Compared to the usual aluminum steering-gear housings, steel housings have a number of advantages including a higher rigidity and toughness of the material. The perceived steering precision is enhanced by the more rigid steel housing. Another advantage is the compact and cost-effective routing of hydraulic lines in the case of the steel housing, in which the screw interfaces can be eliminated. The housing, which can be flexibly adapted to different types of vehicle, is produced as a welded structure from formed pre-configured precision steel tubes with strengths, depending on the degree of forming, of 450 to 650 N/mm$^2$. A special galvanic coating, for example, ensures corrosion protection. The welded-on hydraulic supply lines enable an optimal adaptation to the construction space in the vehicle.

Preferably, the toothed section is configured as a thread extending in the axial direction of the retention and/or support ring. The dismantling of the ring can be facilitated by means of the thread, by the ring with its thread being rotated relative to the internal thread stamped into the inner wall by pressing, thus facilitating the dismantling. Due to the option of dismantling and the facilitation thereof, the assembly according to the invention is not only suitable in a particularly advantageous manner for use during recycling, but can also be disposed of particularly easily and cost-effectively. Moreover, means for applying a dismantling tool are preferably provided.

Preferably, the toothed section pressed into the housing is disposed at a distance from the at least one opening of the housing. A protection against loss is thereby obtained since this distance range for has to be overcome removing the ring from the toothed portion, in order to be able to remove the ring. In the case of the thread, this means that this area must be metal-cut by the thread when the ring is removed by rotation, which requires an increased exertion of force and thus also represents a protection against loss.

Preferably, the retention and/or support ring, at least in the area of the toothed section, has a harder material than the material in an area of the housing adjacent thereto, in order thus to accomplish, on the part of the housing, a plastic deformation of the material in the area of the toothed section, and thus a particularly durable and strong connection. For example, the ring is made from a harder material than the housing.

Preferably, the retention and/or support ring is hardened at least in the area of the toothed section. According to another preferred embodiment, the retention and/or support ring is made of tool steel, for example alloyed or unalloyed tool steel.

According to another advantageous embodiment, the retention and/or support ring is provided with a conical inner circumferential surface for being press-fitted with the housing in an expanding manner. A radial expansion of the ring under the action of a force in the axial direction is particularly easily accomplished by means of a conical inner circumferential surface.

According to another embodiment, the assembly has a rack at least partially disposed in the housing.

Preferably, the retention and/or support ring is provided with a collar supported on an edge of an opening of the housing, for example in order to keep the ring fixed in the axial direction during the expansion. The collar moreover serves as a support when the rack is moved against the retention and/or support ring as a stop during the steering displacement.

The invention further relates to an assembly method for at least one retention and/or support ring at least partially inside a tubular housing which preferably serves for accommodating a rack. The method comprises a disposing step, wherein the at least one retention and/or support ring is disposed at least partially inside the housing. It further comprises an expansion step, wherein the retention and/or support ring is expanded, preferably in its radial direction. The method according to the invention is characterized in that a toothed section disposed on the outer circumferential surface of the retention and/or support ring adjacent to the housing is pressed into the housing. By pressing, the toothed portion of the retention and/or support ring is stamped into the housing, more precisely into its inner wall, and thus provides for a particularly secure connection, the durability of which, in particular in the case of an axial load, goes beyond merely pressing plane touching surfaces together, and without the components having to be welded together expensively. Moreover, the problems caused by welding, i.e. that the support and/or retention ring is difficult to access inside the housing, and that the thermal stress occurring in the process has a disadvantageous effect on the stability of the components, are eliminated.

Preferably, the method comprises a hardening step preceding the disposing step, in which the retention and/or support ring is hardened at least in the area of the toothed section.

According to another advantageous embodiment, the expansion step is carried out by a conical pressing tool acting on a conical inner circumferential surface of the support and/or retention ring.

For the reasons explained above, the toothed section is preferably configured as a thread extending in the axial direction of the retention and/or support ring in the method according to the invention.

In the method according to the invention, an expansion of the housing is preferably prevented during the expansion step, for example, by the housing, in the area of the ring, being accommodated during expansion in a form-closed manner in an accommodating portion of an anvil.

The invention as well as the technical environment is explained in more detail below with reference to the figures. It must be remarked that the Figures depict particularly preferred embodiments of the invention, but that the latter is not limited thereto.

DETAILED DESCRIPTION OF THE INVENTION

Figure 1:
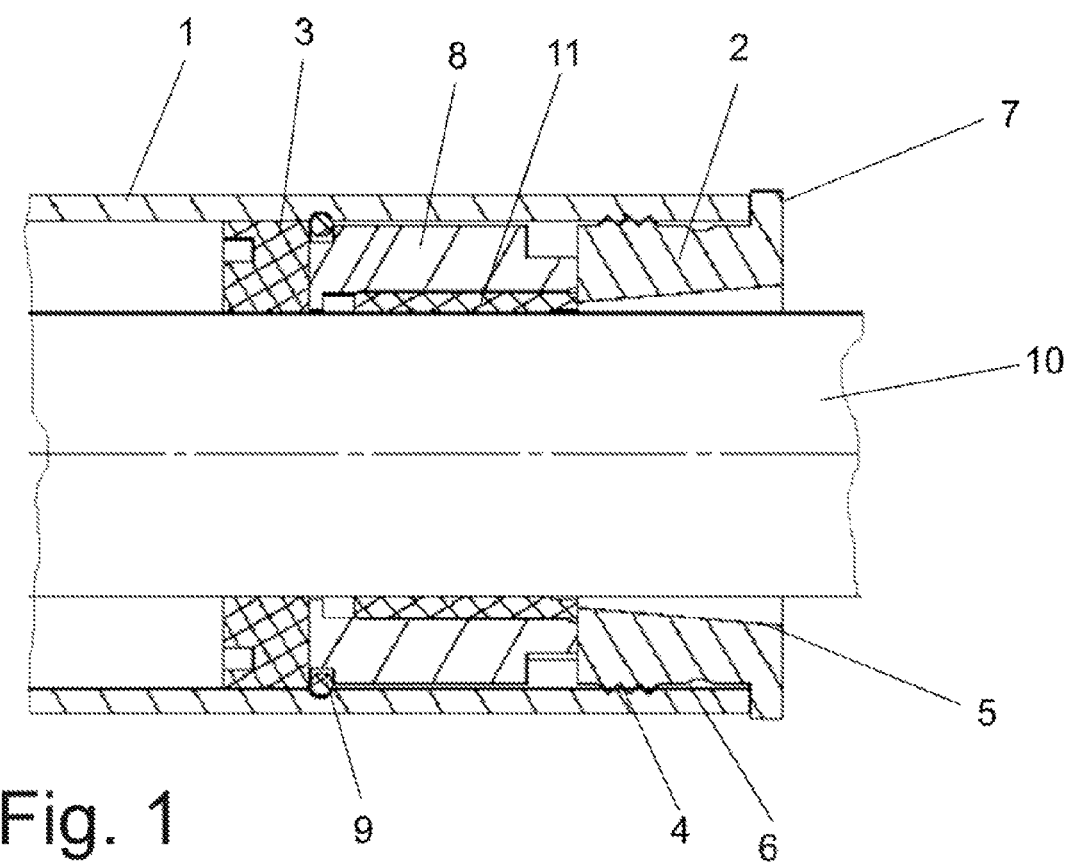
FIG. 1 shows a rack housing segment according to the invention with a support ring in a sectional view and a rack disposed therein.

The rack housing 1 according to the invention, which is made from steel, is only shown in part in FIG. 1. FIG. 1 shows one of the end portions of the rack housing 1. The associated opening is sealed with a support ring 2. The support ring 2 of steel rests with its collar 7 on the edge of the opening of the rack housing 1. On the one hand, the support ring 2 serves as a stop for a cross joint, which is not shown, and which is attached on the end of the rack 10 disposed in the rack housing 1. On the other hand, the support ring 2 serves for supporting a rack support bearing 8 with a slide ring 11, which serve for guiding the rack 10. The rack support bearing 9 is optionally additionally supported by a circlip 9 which is inserted into a peripheral groove in the inner wall of the rack housing 1. Furthermore, an annular gasket 3 is provided which in turn is supported on the rack support bearing 9. In order to attach the support ring 2 on the rack housing 1, the support ring 2 was expanded in its radial direction by a pressing tool with a conical engagement face engaging the conical inner wall 5 of the support ring 2 in the axial direction and the force exerted on the ring 2 by the pressing tool causing an expansion in the radial direction. The support ring 2 comprises a threaded section 4, which has a greater hardness than the steel of the rack housing 1 due to a hardening treatment, so that the threaded section 4 is stamped into the rack housing 1 while plastically deforming it, thus providing for a particularly durable connection of the support ring 2 with the rack housing 1. The support ring 2 can be dismantled from the rack housing 1 by means of the threaded section 4, by the support ring 2 being rotated relative to the rack housing 1 in the appropriate direction. The distance range 6 between the opening of the rack housing 1 and the threaded section 4 which, on the part of the rack housing 1, has remained unthreaded during press-fitting, has to be overcome, i.e. cut, by the threaded section 4 when it is removed by rotation. This requires an increased exertion of force, and the distance range 6 thus serves as a protection against loss.

Figure 2:
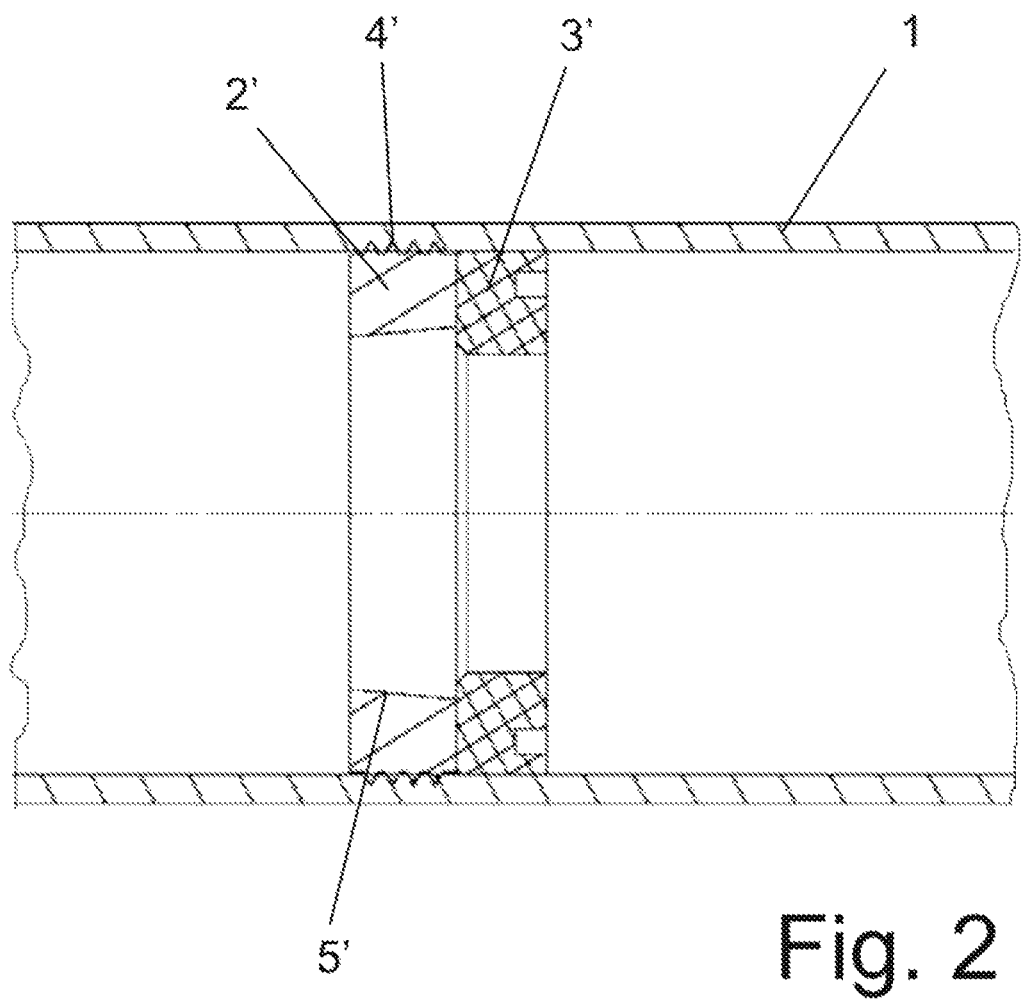
FIG. 2 shows another rack housing segment according to the invention with a retention ring in a sectional view.

FIG. 2 shows another segment of a rack housing 1 according to the invention with a retention ring 2' disposed therein. The retention ring 2' serves for retaining a sealing ring 3 inside, i.e. in the hydraulic area, of the rack housing 1. In order to attach the retention ring 2' on the rack housing 1, the retention ring 2' was expanded in its radial direction by a pressing tool with a conical engagement face engaging the conical inner wall 5 of the retention ring 2' in the axial direction and the force exerted on the retention ring 2' by the pressing tool causing an expansion in its radial direction. The retention ring 2' comprises a toothed section 4', which has a greater hardness than the steel of the rack housing 1 due to a hardening treatment, so that the toothed section 4' is stamped into the rack housing 1 while plastically deforming it, thus providing for a particularly durable connection of the retention ring 2' with the rack housing 1. Substantially configured in a tubular manner.

The invention claimed is:

1. An assembly comprising:
    a tubular housing having at least one opening;
    at least one retention and/or support ring which is at least partially disposed inside the housing and is pressed into the housing while the retention and/or support ring is expanded; and
    an annular gasket and/or sealing ring disposed within the tubular housing and positioned substantially adjacent to the at least one retention and/or support ring;
    wherein a toothed section is provided on the outer circumferential surface of the retention and/or support ring adjacent to the housing; and
    wherein the retention and/or support ring is provided with a conical inner circumferential surface for press-fitting with the housing, which press-fitting expands the retention and/or support ring radially outward against the tubular housing.

2. The assembly according to claim 1, wherein the housing is a rack housing and accommodates a rack.

3. The assembly according to claim 1, wherein the toothed section is a thread extending in the axial direction of the retention and/or support ring.

4. The assembly according to claim 1, wherein the toothed section pressed into the housing is disposed at a distance from the at least one opening of the housing.

5. The assembly according to claim 1, wherein the retention and/or support ring, at least in the area of the toothed section, has a harder material than the material in an area of the housing adjacent thereto.

6. The assembly according to claim 1, wherein the retention and/or support ring, at least in the area of the toothed section, is hardened relative to the remaining portions of the assembly by a method selected from the group consisting of chemical treatment, heat treatment and pressure treatment, or a combination of the same.

7. The assembly according to claim 1, wherein the retention and/or support ring is made from tool steel.

8. The assembly according to claim 1, wherein the housing is substantially made from steel.

9. The assembly according to claim 1, wherein the rack is at least partially disposed in the housing.

10. The assembly according to claim 1, wherein the retention and/or support ring is provided with a collar supported on an edge of an opening of the housing.

11. The assembly according to claim 1, further comprising a rack support bearing for guiding a rack disposed within the tubular housing, the rack support bearing supported by the at least one retention and/or support ring within the tubular housing and positioned substantially adjacent to the at least one retention and/or support ring.

* * * * *